April 14, 1936.  T. LORD  2,037,033
VIBRATION INSULATING JOINT
Filed Sept. 26, 1934  2 Sheets-Sheet 1
Fig. 1.
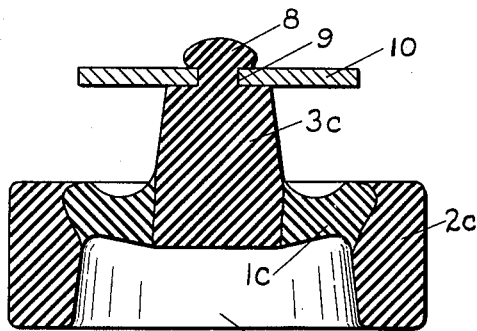
Fig. 4.
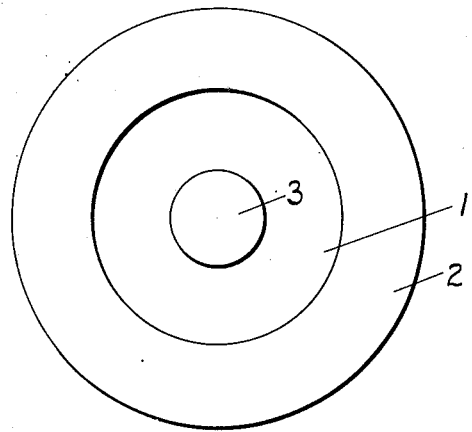
Fig. 2.
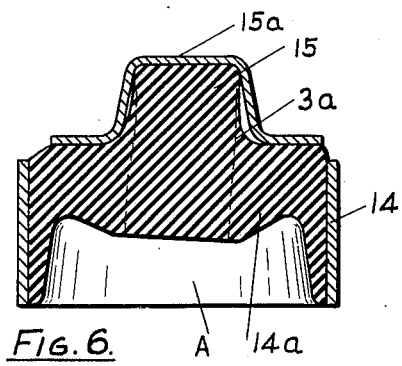
Fig. 6.
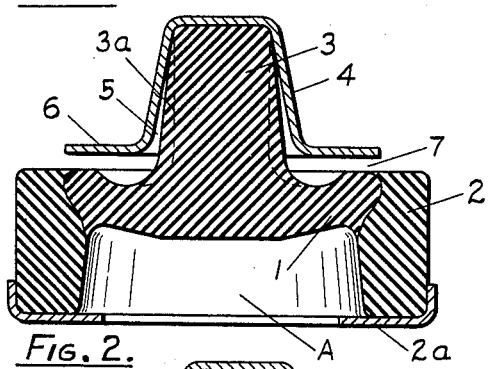
Fig. 3.
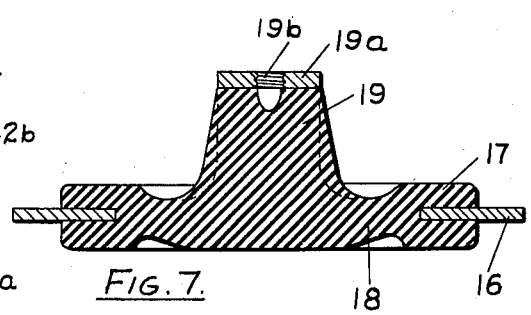
Fig. 7.
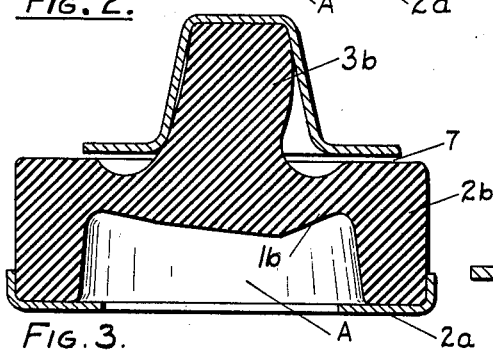
Fig. 5.
Thomas Lord
INVENTOR.
BY *N. L. Lord*
ATTORNEYS.

April 14, 1936. T. LORD 2,037,033
VIBRATION INSULATING JOINT
Filed Sept. 26, 1934 2 Sheets-Sheet 2

Thomas Lord
INVENTOR.
BY
ATTORNEYS.

Patented Apr. 14, 1936

2,037,033

UNITED STATES PATENT OFFICE 2,037,033

VIBRATION INSULATING JOINT

Thomas Lord, Erie, Pa., assignor to Hugh C. Lord, Erie, Pa.

Application September 26, 1934, Serial No. 745,580

16 Claims. (Cl. 248—22)

The present invention is designed to provide a joint for vibration insulation that can be produced very cheaply, but is also in many environments particularly efficient. The insulation of most vibrating instruments can be more definitely achieved if there is complete freedom in all directions and in the preferred form of the present invention this is simply and efficiently attained. The invention also involves structural advantages which may be utilized in a more restricted field. In carrying out the invention it is possible to entirely fabricate it of rubber, or similar material, this very materially cheapening the product and in some respects rendering it more efficient. Preferably the insulation in all directions is accomplished by a distortion of rubber in shear, but some advantages of the invention may be obtained by accommodating the movement only in certain directions in shear. Features and details of the invention will appear from the specification and claims.

Preferred embodiments of the invention are illustrated in the accompanying drawings as follows:—

Fig. 1 is a plan view of a mounting, or vibration supporting joint.

Fig. 2 a sectional view of this mounting with a limiting cap thereon.

Fig. 3 is a section of a modification under load and thrust.

Fig. 4 a sectional view of a modification of the structure.

Figs. 5, 6 and 7 show further modifications.

Figure 8:
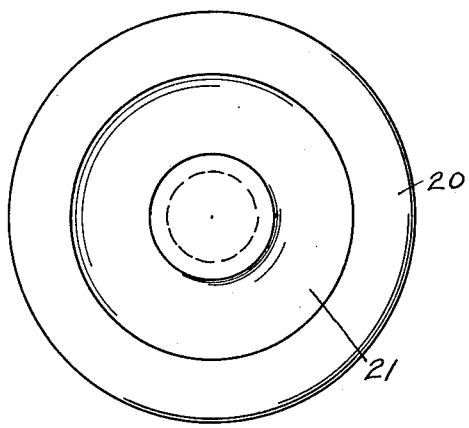
Fig. 8 is a plan view of a modification in which two joint units are arranged in tandem.

In the structure shown in Figs. 1 and 2, 1 marks a rubber element which ordinarily sustains the vertical, or gravity thrust of the joint. It projects from a surrounding wall 2 of rubber, preferably harder than the rubber element 1. Projecting from the rubber element 1 is a member 3. Preferably this member is formed of rubber of the same quality as the rubber in the element 1. A load-carrying cap 4 is mounted over the member 3 and has downwardly extending walls providing an initial space 5 between the walls of the cap and the member 3. The cap has a flange 6 at the bottom which is positioned slightly above the element 1 and projects over the wall 2. The walls 2 maintain the element 1 preferably above the point of support, as for instance, a plate 2a. Thus there is a cup, or cavity A formed under the element and within the wall. This may be, if desired, air-tight.

In the functioning of the mounting the gravity load and vibration thrusts in a vertical direction are sustained through the shear of the rubber projecting as it does from the wall 2 into free space. The horizontal movements are sustained by a shear movement of the member 3, as indicated in Fig. 3. There may also be some yielding of the element 1 in this sidewise movement of the member 3, but such a yielding would be essentially in shear and there may be some bending other than direct shear in the member 3. In any event, the member 3 is free to respond in shear to any sidewise thrust. Thus the mounting is very sensitive to vibrations in every direction. The relation of the resistance to movement may be varied at will. The element 1 may be made thinner, or thicker, to give greater, or less relative resistance. The member 3 may be cylindrically shaped as indicated in dash lines 3a which will make it more sensitive to side thrusts. It may be made shorter, or higher, within reasonable limits. If made shorter, the amount of rubber involved to take up the shear action, of course, will be decreased and the resistance increased. The cap 4 can have any clearance 5 desired between the skirt of the cap and the member 3 and snubs the action at the limit of this clearance. Likewise the flange 6 may be made as far above the element and wall 2 to form any clearance 7 desired so as to snub, or stop, the action with any pre-determined movement.

In Fig. 3 the entire mounting is formed of rubber of substantially the same density and hardness throughout. The element 1b would be a little harder than might be ordinarily used, the wall 2b correspondingly a little softer than where differences in rubber are used and the member 3b would be a little stiffer than that shown in Fig. 2, but for many purposes the advantages of a single quality of rubber would permit of a compromise that would give very efficient effects. As shown the mounting is under load and thrust. The side movement has reached the limit with the skirt of the cap in engagement with the side of the member, but the load has not quite eliminated the clearance 7.

In Fig. 4 the element 1c is made of rubber softer than the wall 2c which may be of hard rubber, if desired, and the member 3c is preferably of slightly harder rubber than the element 1c, but still resilient rubber. The upper end of the member 3 is provided with a projection 8 having an under-cut groove beneath it and this is forced through a perforation 9 in an attaching plate 10. Thus the shape of the rubber member itself is utilized for forming the attachment.

In the modification shown in Fig. 5 a wall 11 has an element 12 projecting from it and a member 13 extending upwardly from the element 12. In this structure the wall 11 and the element 12 are substantially the same rubber, the wall 11 being of sufficient mass to substantially sustain its form under normal load. The member 13 is preferably formed of harder rubber than the element 12 and may, if desired, be formed of what is known as hard rubber, the harder rubber extending to the element, or through the element. An attaching hard rubber plug 13a is also secured in the top of the member 13, preferably during vulcanization.

In Fig. 6 a mounting corresponding to the mounting shown in the patent to Whitehouse, Reissue No. 19,017 has an outer wall in the form of a tube 14 to which a rubber element 14a is preferably secured by bonding during vulcanization. A member 15 which is added by this invention extends upwardly from the element 14a and as shown in Fig. 6 has a load-carrying cap 15a similar to the cap in Fig. 2 and is illustrated with the load and side thrust carried to the limit of clearance.

In Fig. 7 the outer supporting wall is in the form of a flat sheet plate 16 having an annular opening 17 therein and a rubber element 18 having a wall portion overlapping the upper and lower surface of the plate 16 and bonded thereto, preferably by vulcanization in the manner indicated in the application of Hugh C. Lord and myself, Serial Number 546,214. Here a member 19 projects from the element 18 and is provided with an attaching plate 19a on its top which is preferably bonded during vulcanization to the upper end of the member and provided with a screw-threaded opening 19b for ready attachment to a load. The member 19 may be made of soft rubber, as in Fig. 1, or of hard rubber, as in Fig. 5.

All of these modifications may be provided with the cap as shown in Figs. 1, 2, 3 and 6, with the plug as shown in Fig. 5, with the under-cut head as shown in Fig. 4 except where the central member is of hard rubber as it may be and the attaching plate 19a may be attached to any modification instead of the cap, plug, or plate 10. In fact one of the important features of the invention is its adaptability to the modifications as to its outer wall, as to its element, as to its member, and as to its load-carrying attachment. Thus the outer wall may be harder and of less mass, softer and of greater mass, and may in some cases have a metal support and as to all modifications the upwardly projecting member from the rubber element may be made smaller, or longer, to make it more sensitive to side thrust, or larger, or smaller, to make it more resistant to side thrust.

In Fig. 8 each unit is supplied with a wall 20, a rubber element 21, and a connecting rubber element 22. In this structure the outer walls, the rubber element and the connecting member 22 are of the same quality of rubber. It differs in its effectiveness with relation to the structure shown in Fig. 1 in that the two elements 21 add to the softness of the unit. The member 22 not only rocks in response to side thrust, but responds to this thrust in shear.

Figure 9:
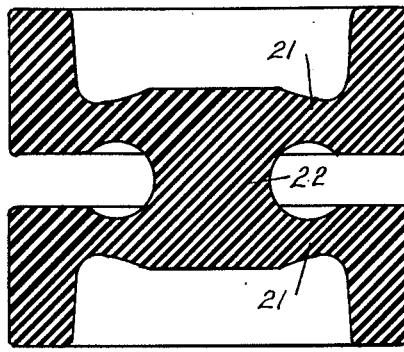
Fig. 9 is a sectional view of the same.
Figure 10:
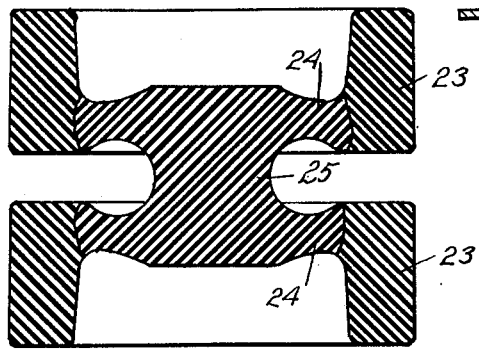

The structure shown in Fig. 10 differs from that of Fig. 9 in that the wall 23 in each unit is of harder rubber than that used in the element 24 and connecting member 25. The wall 23 may be of what is usually termed definitely hard rubber.

Figure 11:
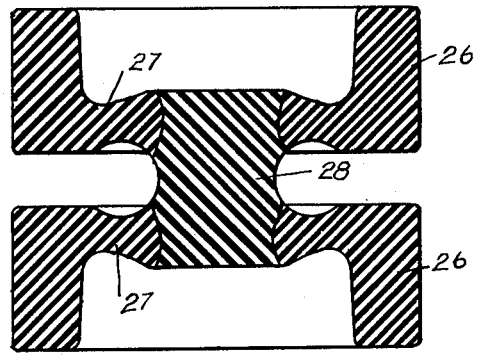
Figs. 10, 11, 12 and 13 show sectional views of further modifications of the double unit type.

In the structure shown in Fig. 11 there is a wall 26 similar to the wall 20 and an element 27 similar to the element 21. A connecting member 28 is of hard rubber. This permits the making of a wobble joint entirely of rubber having a functional response similar to the joint indicated in the application of Hugh C. Lord, Serial Number 554,283, filed July 31, 1931.

Figure 12:
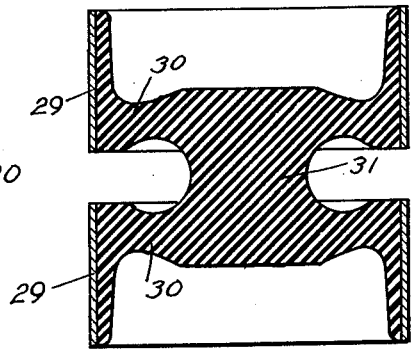

In Fig. 12 outer walls 29 of the units are of metal and rubber elements 30 are bonded to these metal tubes and are connected by a connecting member 31 similar to the connecting member 22.

Figure 13:
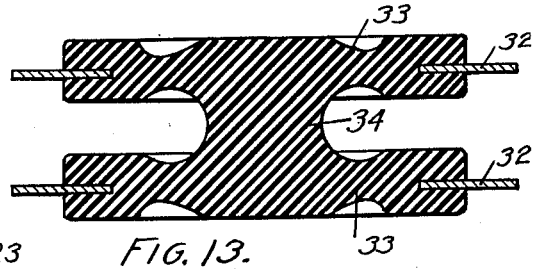

In the structure shown in Fig. 13 the outer member of each unit is in the form of a plate 32 similar to the plate shown in Fig. 7. The elements 33 are similar to the elements 18 and the connecting member 34 is similar to the connecting member 22.

What I claim as new is:—

1. In a vibration insulating joint, the combination of a wall; a resilient element projecting laterally from the wall into free space; and a lateraly resilient member projecting directly from the element and off-set from the wall, said member being responsive through its resilience to side thrust upon it.

2. In a vibration insulating joint, the combination of a wall; a rubber element projecting laterally from the wall into free space and resisting thrusts crosswise of the projection in shear; and a laterally resilient member extending directly from and in a direction crosswise of the element, said member being off-set from the wall.

3. In a vibration insulating joint, the combination of a wall; a rubber element projecting laterally from the wall into free space and resisting thrusts crosswise of the projection; and a laterally resilient rubber member extending directly from and in a direction crosswise of the element, said member being off-set from the wall.

4. In a vibration insulating joint, the combination of a wall; a rubber element projecting laterally from the wall into free space and resisting thrusts crosswise of the projection; a laterally resilient rubber member extending directly from and in a direction crosswise of the element, said member being off-set from the wall; and means permanently attached to the member adapted to receive a load.

5. In a vibration insulating joint, the combination of a wall; a rubber element projecting laterally from the wall into free space and resisting thrusts crosswise of the projection; a laterally resilient rubber member extending directly from and in a direction crosswise of the element, said member being off-set from the wall and said member having an undercut portion; and an attaching plate secured to the member under said under-cut portion.

6. In a vibration insulating joint, the combination of a wall; a rubber element projecting laterally from the wall into free space and resisting thrusts crosswise of the projection; a laterally resilient rubber member extending directly from and in a direction crosswise of the element, said member being off-set from the wall; and means limiting the lateral movement of the member relatively to the wall.

7. In a vibration insulating joint, the combination of a wall; a rubber element projecting laterally from the wall into free space and resisting thrusts crosswise of the projection; a laterally resilient rubber member extending directly from and in a direction crosswise of the element, said member being off-set from the wall; and means limiting the crosswise movement of the member relatively to the element.

8. In a vibration insulating joint, the combination of a wall; a rubber element projecting laterally from the wall into free space and resisting thrusts crosswise of the projection; a laterally resilient rubber member extending directly from and in a direction crosswise of the element, said member being off-set from the wall; and means limiting the lateral movement of the member relatively to the wall and the crosswise movement of the member relatively to the element.

9. In a vibration insulating joint, the combination of a support having opposing wall surfaces; a resilient element comprising means projecting from said opposing wall surfaces into free space and resisting thrusts to the projection in shear; and a laterally resilient rubber member extending directly from and in a direction crosswise of the element, said member being off-set from said walls.

10. In a vibration insulating joint, the combination of an annular wall; a rubber element having rubber portions extending radially from the wall into free space and resisting axial thrusts in shear; and a laterally resilient rubber member extending directly and axially from the element, said member being off-set from the wall.

11. In a vibration insulating joint, the combination of an annular wall; a rubber element having rubber portions extending radially from the wall into free space and resisting axial thrusts in shear; a laterally resilient rubber member extending directly and axially from the element, said member being off-set from the wall; and a cap arranged on the rubber member having a skirt with free space between it and the member.

12. In a vibration insulating joint, the combination of an annular wall; a rubber element having rubber portions extending radially from the wall into free space and resisting axial thrusts in shear; a laterally resilient rubber member extending directly and axially from the element, said member being off-set from the wall; and a cap arranged on the rubber member having a flanged skirt leaving a free space between the skirt and the member and the element and the flange.

13. In a vibration insulating joint, the combination of a rubber wall; a rubber element projecting laterally from the wall into free space and resisting thrusts crosswise of the projection in shear; and a laterally resilient rubber member extending directly from and in a direction crosswise of the element, said member being off-set from the wall.

14. In a vibration insulating joint, the combination of two joint units, each having a wall and each unit having a resilient rubber element projecting from the wall of said unit into free space and resisting thrusts crosswise of the projection in shear; and a laterally resilient member extending directly from and in a crosswise direction joining said elements, said member being off-set from the walls.

15. In a vibration insulating joint, the combination of two joint units, each having a surrounding wall and each unit having a resilient rubber element projecting from the wall of said unit into free space and resisting axial thrusts in shear; and a laterally resilient rubber member extending directly from and in an axial direction joining said elements, said member being off-set from the walls.

16. In a vibration insulating joint, the combination of two joint units, each having a surrounding rubber wall and each unit having a resilient rubber element projecting from the wall of said unit into free space and resisting thrusts crosswise of the projection in shear; and a laterally resilient rubber member extending directly from and in a crosswise direction joining said elements, said member being off-set from the walls.

THOMAS LORD.